(12) United States Patent
Pani et al.

(10) Patent No.: US 8,817,781 B2
(45) Date of Patent: Aug. 26, 2014

(54) METHOD AND APPARATUS FOR SUPPORTING SEGMENTATION OF PACKETS FOR UPLINK TRANSMISSION

(75) Inventors: Diana Pani, Montreal (CA); Christopher R Cave, Montreal (CA); Paul Marinier, Brossard (CA); Stephen E Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 44 days.

(21) Appl. No.: 13/423,628

(22) Filed: Mar. 19, 2012

(65) Prior Publication Data

US 2012/0176971 A1    Jul. 12, 2012

Related U.S. Application Data

(63) Continuation of application No. 12/238,599, filed on Sep. 26, 2008, now Pat. No. 8,139,609.

(60) Provisional application No. 60/975,596, filed on Sep. 27, 2007.

(51) Int. Cl.
*H04L 12/28* (2006.01)

(52) U.S. Cl.
USPC ............................. 370/389; 370/392; 370/474

(58) Field of Classification Search
USPC ......... 370/329, 331, 349, 389, 394, 466, 392, 370/474
See application file for complete search history.

(56) References Cited

U.S. PATENT DOCUMENTS

| 2003/0147371 | A1* | 8/2003 | Choi et al. | 370/341 |
| 2006/0165045 | A1* | 7/2006 | Kim et al. | 370/349 |
| 2006/0187844 | A1* | 8/2006 | Chun et al. | 370/242 |

(Continued)

FOREIGN PATENT DOCUMENTS

| EP | 1 720 322 | 11/2006 |
| EP | 1 764 980 | 3/2007 |

(Continued)

OTHER PUBLICATIONS

Ericsson et al., "New Work Item Proposal: Improved L2 for Uplink", 3GPP TSG-RAN Meeting #37, RP-070717, (Riga, Latvia, Sep. 11-14, 2007).

(Continued)

*Primary Examiner* — Ricky Ngo
*Assistant Examiner* — Kabir Jahangir
(74) *Attorney, Agent, or Firm* — Volpe and Koenig, P.C.

(57) ABSTRACT

A method and apparatus for segmenting medium access control (MAC) service data units (SDUs) creates enhanced MAC-es PDUs in the enhanced MAC-e/es sub-layer by concatenating MAC SDUs received from the logical channels. An enhanced transport format combination (E-TFC) selection entity controls the concatenation of MAC SDUs into enhanced MAC-es PDUs. When a MAC SDU is received that is too large to fit into a selected enhanced MAC-es PDU payload, a segmentation entity segments the MAC SDU such that the MAC SDU segment fills the remaining payload available in the selected enhanced MAC-es PDU. The enhanced MAC-es PDU is then assigned a transmission sequence number (TSN) and multiplexed with other enhanced MAC-es PDUs to create a single enhanced MAC-e PDU that is transmitted on the E-DCH in the next transmission time interval (TTI). A HARQ entity stores and, if necessary retransmits the enhanced MAC-e PDU when a transmission error occurs.

14 Claims, 10 Drawing Sheets

(56) References Cited

U.S. PATENT DOCUMENTS

| | | | |
|---|---|---|---|
| 2007/0014229 A1 | 1/2007 | Hepler et al. | |
| 2007/0047452 A1 | 3/2007 | Lohr et al. | |
| 2007/0140261 A1* | 6/2007 | Wang et al. | 370/395.42 |
| 2007/0291687 A1* | 12/2007 | Kuo et al. | 370/328 |
| 2008/0009289 A1 | 1/2008 | Kashima et al. | |
| 2008/0170516 A1* | 7/2008 | Carmon et al. | 370/310 |
| 2009/0010278 A1* | 1/2009 | Torsner et al. | 370/466 |
| 2010/0220638 A1* | 9/2010 | Carmon et al. | 370/310 |

FOREIGN PATENT DOCUMENTS

| | | |
|---|---|---|
| KR | 2003-0004618 | 1/2003 |
| WO | 00/21253 | 4/2000 |
| WO | 2007/020070 | 2/2007 |
| WO | 2007/091965 | 8/2007 |

OTHER PUBLICATIONS

Ericsson, "L2 enhancements," 3GPP TSG-RAN WG2 Meeting #56bis, R2-07xxxx (Feb. 12-16, 2007).
Ericsson, "User plane protocol enhancements," TSG-RAN WG2 Meeting #48bis, R2-052508 (Oct. 10-14, 2005).
Ericsson, "User plane protocol enhancements," TSG-RAN WG2 Meeting #48bis, R2-052749 (Oct. 10-14, 2005).
Samsung et al., "Defining of reordering SDU and correction to the definition of the SI field," 3GPP TSG-RAN WG2#59, R2-073834 (Aug. 20-24, 2007).
Third Generation Partnership Project, "Technical Specification Group Radio Access Network; Medium Access Control (MAC) Protocol Specification (Release 7)," 3GPP TS 25.321 V7.5.0 (Jun. 2007).
Third Generation Partnership Project, Technical Specification Group Radio Access Network; Radio Link Control (RLC) protocol specification (Release 1999); 3GPP TS 25.322 V3.18.0 (Jun. 2004).
Third Generation Partnership Project, Technical Specification Group Radio Access Network; Radio Link Control (RLC) protocol specification (Release 4); 3GPP TS 25.322 V4.12.0 (Jun. 2004).
Third Generation Partnership Project, Technical Specification Group Radio Access Network; Radio Link Control (RLC) protocol specification (Release 5); 3GPP TS 25.322 V5.13.0 (Dec. 2005).
Third Generation Partnership Project, Technical Specification Group Radio Access Network; Radio Link Control (RLC) protocol specification (Release 6); 3GPP TS 25.322 V6.10.0 (Jun. 2007).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 5)," 3GPP TS 25.321 V5.13.0 (Mar. 2007).
Third Generation Partnership Project, "Technical Specification Group Radio Access Network; Medium Access Control (MAC) protocol specification (Release 6)," 3GPP TS 25.321 V6.13.0 (Jun. 2007).
Third Generation Partnership Project, "Technical Specification Group Radio Access Network; Radio Link Control (RLC) protocol specification (Release 7)," 3GPP TS 25.322 V7.3.0 (Jun. 2007).
Ericsson et al., "New Work Item Proposal: Improved L2 for Uplink", 3GPP TSG-RAN Meeting #37, RP- 070717, (Riga, Latvia, Sep. 11-14, 2007).
Ericsson, "L2 enhancements," 3GPP TSG-RAN WG2 Meeting #56bis, R2-07xxxx (R2-071586) (Feb. 12-16, 2007).
Third Generation Partnership Project, "Technical Specification Group Radio Access Netowrk; Medium Access Control (MAC) protocol specification (Release 6)," 3GPP TS 25.321 V6.13.0 (Jun. 2007).
Third Generation Partnership Project, "Technical Specification Group Radio Access Network; Medium Access Control (MAC) Protocol Specification (Release 7)," 3GPP TS 25.321 V7.10.0 (Sep. 2008).
Third Generation Partnership Project, "Technical Specification Group Radio Access Network; Medium Access Control (MAC) Protocol Specification (Release 8)," 3GPP TS 25.321 V8.3.0 (Sep. 2008).
Third Generation Partnership Project, "Technical Specification Group Radio Access Network; Medium Access Control (MAC) protocol specification (Release 6)," 3GPP TS 25.321 V6.16.0 (Sep. 2008).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, "Technical Specification Group Radio Access Network; Radio Link Control (RLC) protocol specification (Release 7)," 3GPP TS 25.322 V7.8.0 (Sep. 2008).
Third Generation Partnership Project, "Technical Specification Group Radio Access Network; Radio Link Control (RLC) protocol specification (Release 8)," 3GPP TS 25.322 V8.3.0 (Sep. 2008).
Third Generation Partnership Project, "Technical Specification Group Radio Access Network; Radio Link Control (RLC) protocol specification (Release 6)," 3GPP TS 25.322 V6.12.0 (May 2008).
Interdigital, "MAC-hs header for Improved L2 Support for High Data Rates," 3GPP TSG-RAN WG2#57, R2-070673 (Feb. 12-16, 2007).
Panasonic, "RLC PDU format for LTE," 3GPP TSG RAN WG2#56bis, R2-070095 (Jan. 15-19, 2007).

* cited by examiner

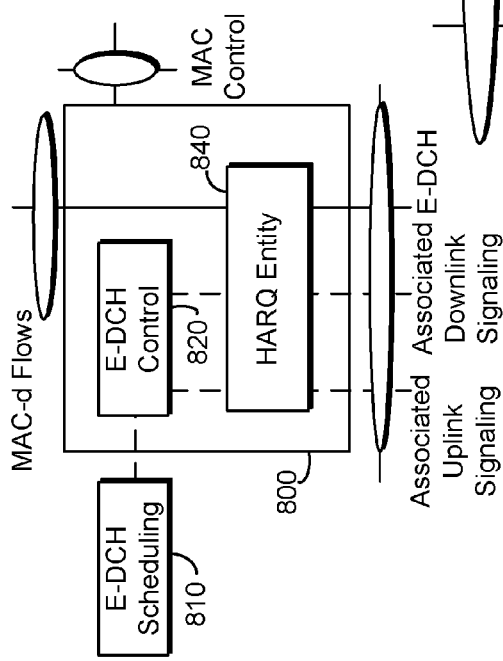
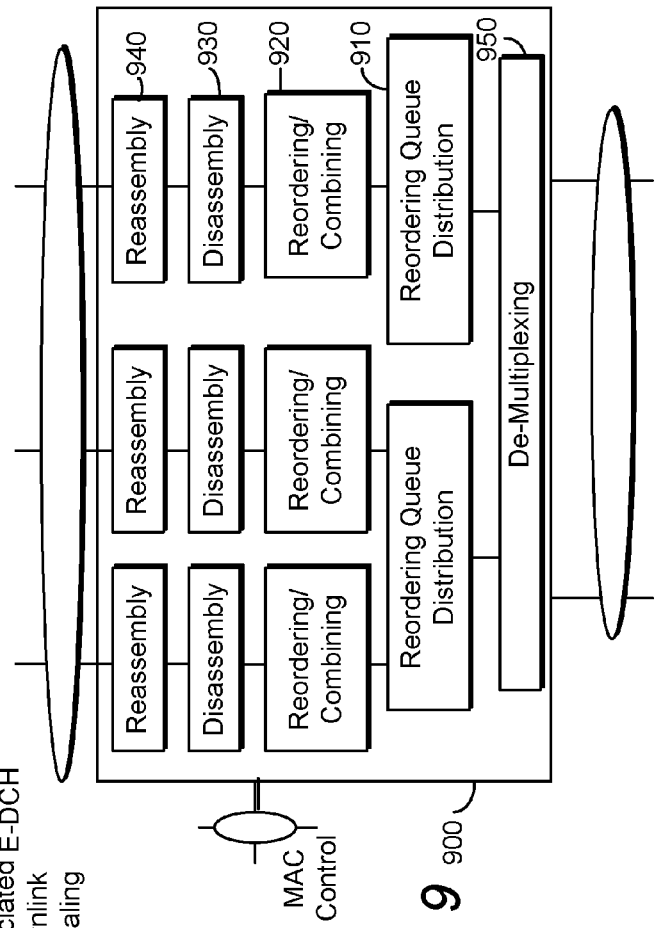

METHOD AND APPARATUS FOR SUPPORTING SEGMENTATION OF PACKETS FOR UPLINK TRANSMISSION

CROSS REFERENCE TO RELATED APPLICATIONS

This application is a continuation of U.S. patent application Ser. No. 12/238,599, filed Sep. 26, 2008, which claims the benefit of U.S. provisional application No. 60/975,596 filed Sep. 27, 2007, which is incorporated by reference as if fully set forth.

FIELD OF INVENTION

This application is related to wireless communications.

BACKGROUND

The third generation partnership project (3GPP) Release 6, introduced high-speed uplink packet access (HSUPA) to provide higher data rates for uplink transmissions. As part of HSUPA, a new transport channel, the enhanced dedicated channel (E-DCH), was introduced to carry uplink (UL) data at higher rates. Along with the E-DCH, new MAC sub-layers were introduced within the overall wireless transmit/receive unit (WTRU) to control the E-DCH transport channel. The new MAC sub-layer is the MAC-e/es. More specifically, the MAC-e/es is the MAC entity that handles the data transmitted on the E-DCH. Upper layers configure how the MAC-e/es is to be applied to handle E-DCH functionality.

A block diagram of the UMTS Terrestrial Radio Access Network (UTRAN) MAC-e layer architecture is shown in FIG. 1, a block diagram of the UMTS Terrestrial Radio Access Network (UTRAN) MAC-es layer architecture is shown in FIG. 2, and a block diagram of the WTRU MAC-e/es layer architecture is shown in FIG. 3.

For each WTRU that uses the E-DCH, one MAC-e entity per NodeB and one MAC-es entity in a serving radio network controller (SRNC) are configured.

FIG. 1 shows a UTRAN MAC-e 100 and a E-DCH scheduling entity 110. The MAC-e 100 is located in a NodeB and controls access to the E-DCH. There is one MAC-e 100 in the NodeB for each WTRU. There is only one E-DCH scheduling entity 110 in the NodeB. The E-DCH scheduling entity 110 manages E-DCH cell resources between WTRUs.

The UTRAN MAC-e 100 shown in FIG. 1 comprises an E-DCH control entity 120, a de-multiplexing entity 130, and a hybrid automatic retransmission request entity (HARQ) entity 140. The MAC-e 100 and the E-DCH scheduling entity 110 handle HSUPA specific functions in the NodeB.

The UTRAN MAC-es 200 shown in FIG. 2 comprises a reordering queue distribution entity 210, a reordering/combining entity 220, and a disassembly entity 230. The UTRAN MAC-es 200 further comprises a macro diversity selection entity in FDD mode when there is soft handover with multiple NodeBs. The MAC-es 200 is located in the SRNC and handles E-DCH specification functionality that is not covered in the MAC-e in the NodeB. The MAC-es 200 is connected to both the MAC-e and the MAC-d.

FIG. 3 shows a block diagram of the WTRU MAC-e/es layer architecture. The WTRU MAC-e/es 300 comprises a HARQ entity 310, a multiplexing and transmission sequence number (TSN) setting entity 320, and an enhanced transport format combination (E-TFC) selection entity 330.

The HARQ entity 310 handles the MAC functions relating to the HARQ protocol. Specifically, the HARQ entity 310 is responsible for storing MAC-e payloads and re-transmitting them. The detailed configuration of the HARQ protocol is provided by the radio resource control (RRC) over the MAC-control service access point (SAP).

The multiplexing and TSN setting entity 320 concatenates multiple MAC-d protocol data units (PDUs) into MAC-es PDUs. Further, the multiplexing and TSN setting entity 320 multiplexes one or more MAC-es PDUs into a single MAC-e PDU, to be transmitted in a next transmission time interval (TTI), as instructed by the E-TFC selection entity 330. The multiplexing and TSN setting entity 320 is also responsible for managing and setting the TSN per logical channel for each MAC-es PDU.

The E-TFC selection entity 330 is responsible for E-TFC selection according to scheduling information, relative grants and absolute grants, received from the UTRAN via L1 signaling and a serving grant value signaled through RRC. The E-TFC selection entity 330 is also responsible for arbitration among the different flows mapped on the E-DCH. The detailed configuration of the E-TFC selection entity 330 is provided by RRC over the MAC-control SAP. As stated above, the E-TFC selection entity 330 controls the multiplexing function of the multiplexing and TSN setting entity 320.

Currently, the MAC-e/es selects a number of MAC service data units (SDUs) from each logical channel and multiplexes the MAC SDUs into a single MAC-e PDU for transmission. The existing MAC-e/es protocol relies on the fact that the RLC is configured to deliver PDUs in one or more predefined sizes. Unfortunately, the use of predefined PDU sizes creates overhead at higher data rates.

Accordingly, there exists a need for improved MAC-e/es architecture in both the UTRAN and WTRU that allows for flexible PDU sizes at the radio link control (RLC) layer and PDU segmentation at the MAC layer. The use of flexible PDU sizes and PDU segmentation would allow for higher data rates in the UL and may reduce header overhead for UL transmissions.

SUMMARY

Service data units (SDUs) containing data submitted to the MAC sub-layer are created by higher layers. When the WTRU is configured to use the E-DCH, the MAC SDU is passed to the enhanced MAC-e/es sub-layer in the WTRU, which controls data transmitted on the E-DCH. Enhanced MAC-es PDUs are created in the enhanced MAC-e/es sub-layer by concatenating MAC SDUs received from the logical channels. The enhanced MAC-es PDUs are assigned a transmission sequence number (TSN) and then multiplexed into a single enhanced MAC-e PDU for transmission on the E-DCH. An enhanced transport format combination (E-TFC) selection entity controls the concatenation of MAC SDUs into enhanced MAC-es PDUs. When a MAC SDU is received that is too large to fit into a selected enhanced MAC-es PDU payload, a segmentation entity segments the MAC SDU such that the MAC SDU segment fills the remaining payload available in the selected enhanced MAC-es PDU. The enhanced MAC-es PDU is then multiplexed with other enhanced MAC-es PDUs to create a single enhanced MAC-e PDU that is transmitted on the E-DCH in the next TTI. A HARQ entity stores and, if necessary retransmits the enhanced MAC-e PDU when a transmission error occurs.

When a MAC SDU is segmented, the remaining segment of the MAC SDU that is not included in the next enhanced MAC-es PDU may be stored in a segmentation buffer or segmentation entity. The stored remaining segment is then included in a subsequent enhanced MAC-es PDU. For a subsequent transmission, if the remaining segment of MAC SDU is too large for the enhanced MAC-es payload, this remaining segment may be segmented again. In an embodiment, buffered MAC SDU segments are given priority when enhanced MAC-es PDUs are being created. Segmentation entities are emptied before more information is requested from the logical channels for inclusion in a MAC-es PDU. A segmentation entity may be provided for each logical channel, or alternatively, a single segmentation entity may be provided for storing MAC-d PDU segments for all logical channels. In the latter, only segments from one logical channel may be stored in the segmentation entity at a time. No other segmentation processes should take place for another logical channel until the data in the segmentation entity is transmitted. When segmentation occurs, the enhanced MAC-es PDU may include a segmentation description in addition to the TSN. The segmentation description indicates whether a segment is included in the enhanced MAC-es PDU and whether there are more segments to follow.

In the UTRAN, enhanced MAC-e PDUs containing MAC SDUs or segments thereof are de-multiplexed into enhanced MAC-es PDUs at the enhanced MAC-e sub-layer located in the NodeB. After de-multiplexing, the enhanced MAC-es PDUs are processed in the enhanced MAC-es sub-layer located at the RNC. The enhanced MAC-es PDUs are reordered by their associated queues in a reordering queue distribution entity then reordered by sequence number per logical channel according to their TSN. A disassembly entity then disassembles the concatenated MAC SDUs and/or MAC SDU segments. A reassembly entity reassembles MAC SDU segments into the complete MAC SDU and then directs all complete MAC SDUs to the proper higher layer entity.

BRIEF DESCRIPTION OF THE DRAWINGS

A more detailed understanding may be had from the following description, given by way of example in conjunction with the accompanying drawings wherein:

FIG. 8 is a block diagram of a UTRAN enhanced MAC-e in accordance with a first embodiment;
FIG. 9 is a block diagram of a UTRAN enhanced MAC-es in accordance with a first embodiment.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
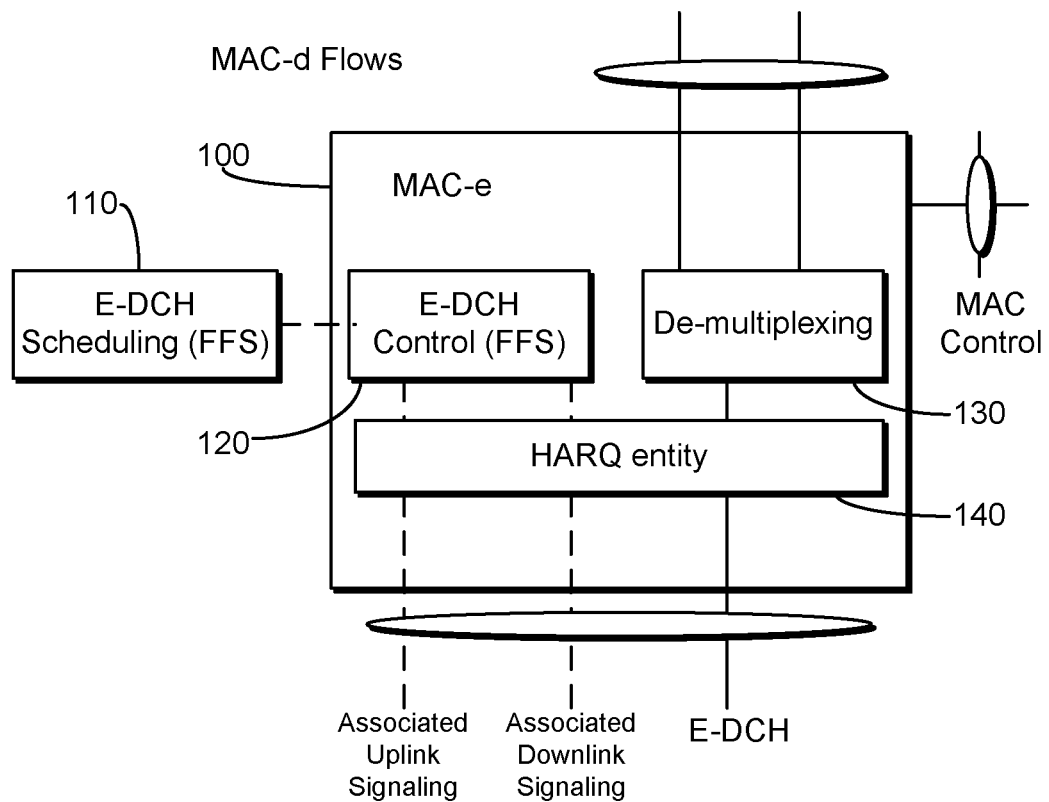
FIG. 1 is a prior art UTRAN MAC/e.
Figure 2:
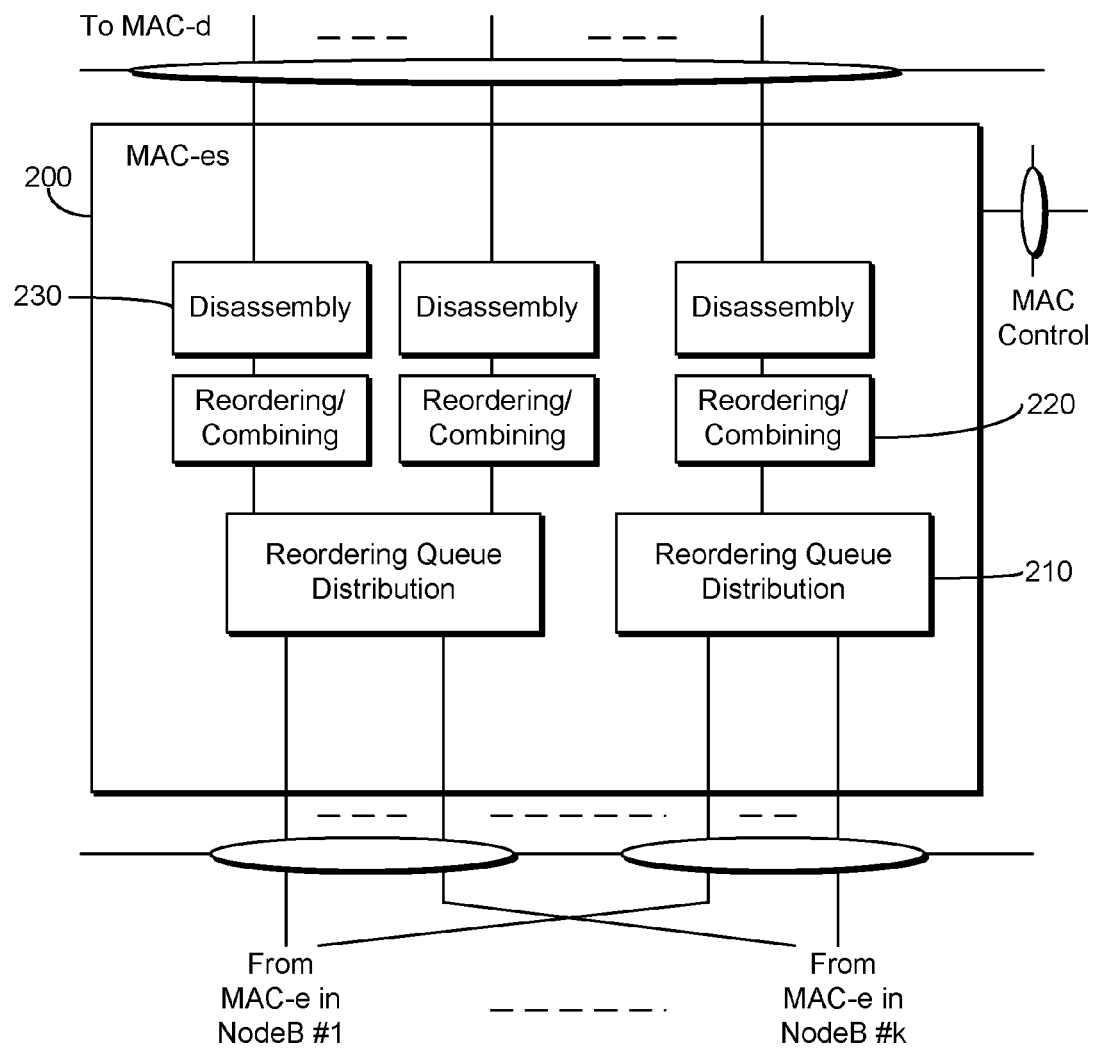
FIG. 2 is a prior art UTRAN MAC/es.
Figure 3:
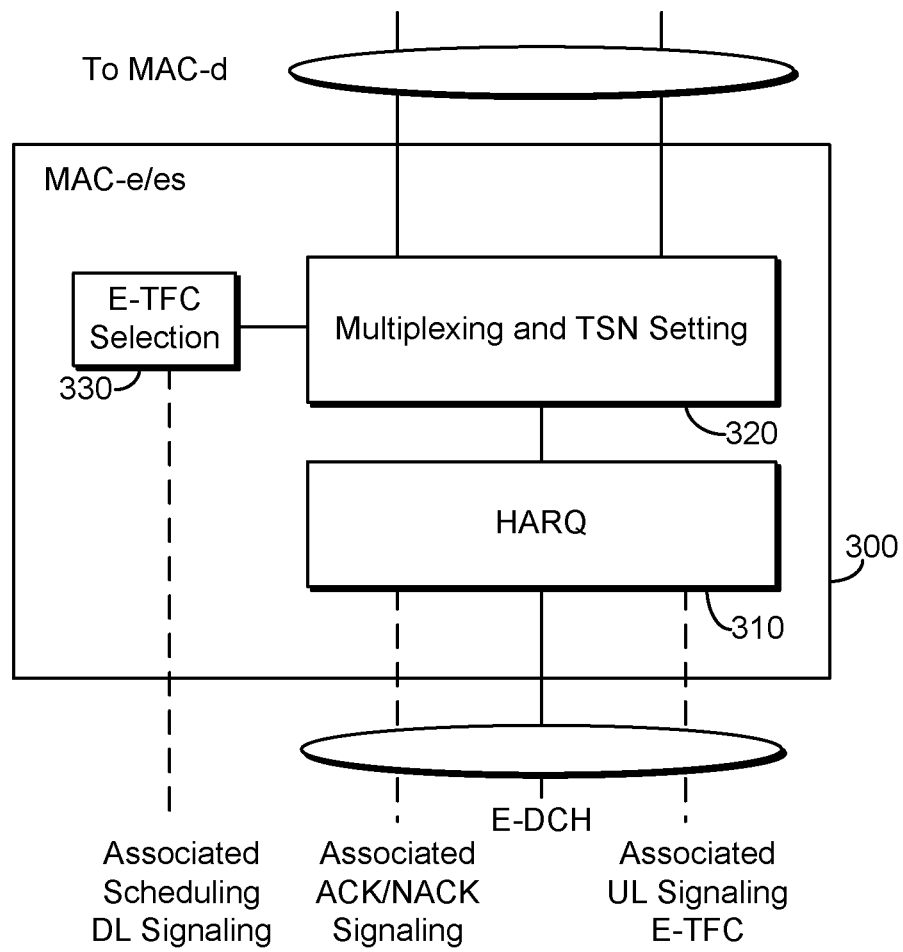
FIG. 3 is a prior art WTRU MAC-e/es.
Figure 4:
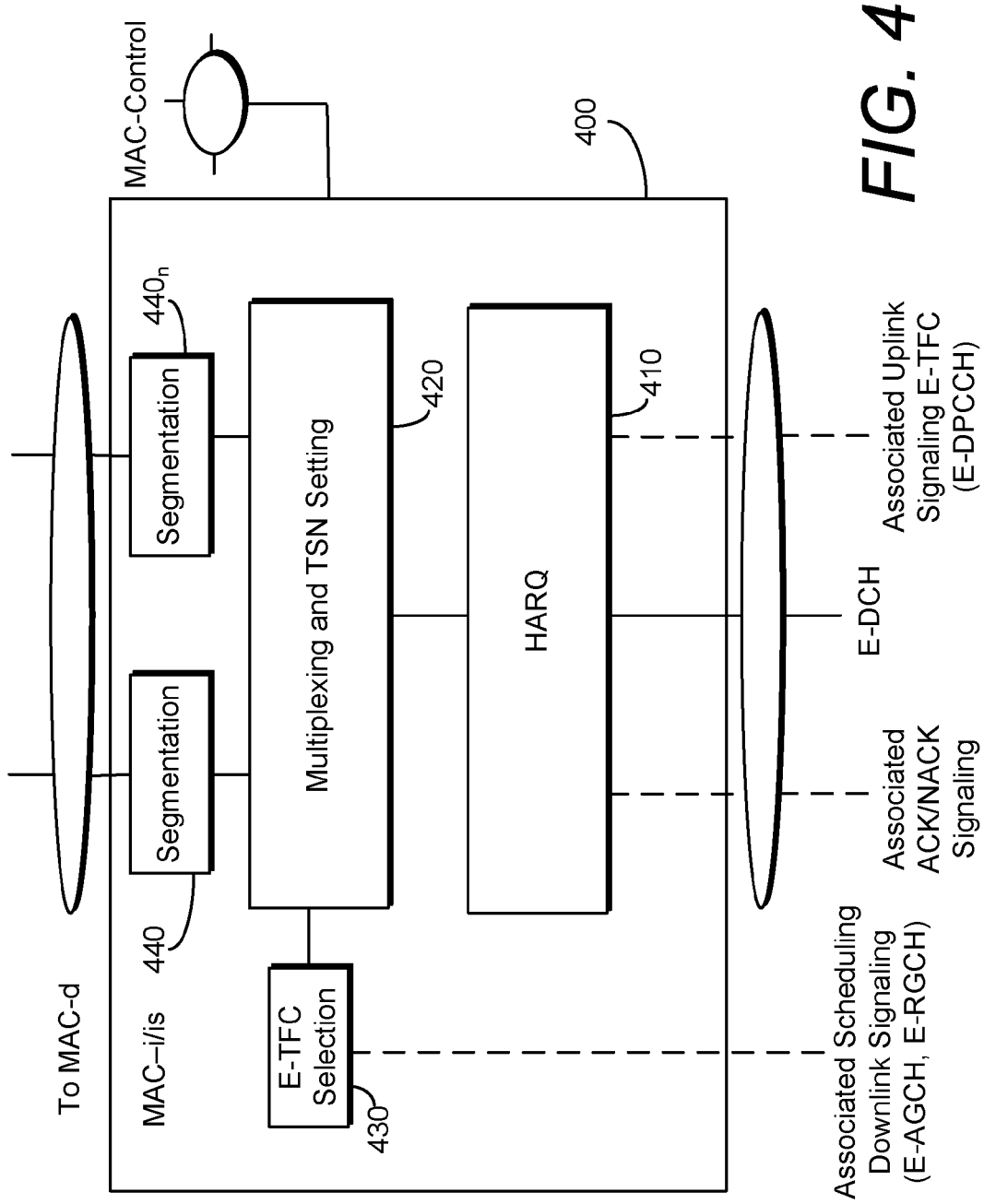
FIG. 4 is a block diagram of a WTRU enhanced MAC-e/es in accordance with a first embodiment.

FIG. 4 is a block diagram of a WTRU enhanced MAC-e/es 400 in accordance with a first embodiment. The WTRU enhanced MAC-e/es 400 comprises a HARQ entity 410, a multiplexing and TSN setting entity 420, an E-TFC selection entity 430, and at least one segmentation entity 440, $440_n$.

The HARQ entity 410 is configured to store enhanced MAC-e PDUs and retransmit them. The detailed configuration of the HARQ protocol is provided by the radio resource control (RRC) over the MAC-control service access point (SAP).

The multiplexing and TSN setting entity 420 is configured to concatenate multiple MAC SDUs or segments thereof into enhanced MAC-es PDUs. In one embodiment, the multiplexing and TSN setting entity 420 may segment a MAC SDU to fill an enhanced MAC-es PDU as instructed by the E-TFC selection entity 430 if a MAC SDU is too large to fit into a selected payload size for a specific logical channel.

Further, the multiplexing and TSN setting entity 420 is configured to multiplex one or more enhanced MAC-es PDUs into a single enhanced MAC-e PDU, to be transmitted in a next TTI, as instructed by the E-TFC selection entity 430. The multiplexing and TSN setting entity 420 is further configured to manage and set the TSN per logical channel for each enhanced MAC-es PDU.

The E-TFC selection entity 430 is configured to control E-TFC selection according to scheduling information, relative grants and absolute grants, received from the UTRAN via L1 signaling and a serving grant value signaled through RRC. The E-TFC selection entity 430 is further configured for arbitrating different flows mapped on the E-DCH. The detailed configuration of the E-TFC selection entity 430 is provided by the RRC over the MAC-control SAP. As stated above, the E-TFC selection entity 430 controls the multiplexing function of the multiplexing and TSN setting entity 420.

As stated above, the WTRU enhanced MAC-e/es comprises at least one segmentation entity 440, $440_n$. More specifically, there is one segmentation entity 440, $440_n$ for each logical channel in each WTRU. The segmentation entity 440, $440_n$ is configured to segment MAC SDUs. As shown in FIG. 4, in one embodiment, the segmentation of the MAC SDU may occur prior to multiplexing and TSN setting an UL transmission.

The segmentation entity 440, $440_n$ may segment a MAC SDU if the SDU is too large to fit into a selected enhanced MAC-e payload as instructed by the E-TFC selection entity 430. For a subsequent transmission, if the remaining segment of MAC SDU is too large to fit into a selected enhanced MAC-e payload as instructed by the E-TFC selection entity 430, this remaining segment may be segmented again. Further, the segmentation entity 440, $440_n$ may segment a MAC SDU based on a remaining payload for each logical channel.

Each segmentation entity 440, $440_n$ may comprise a buffer configured to store a segment of a MAC SDU after the segmentation of the MAC SDU. After the segmentation of the MAC SDU, a segment of the MAC-SDU is transmitted and the remaining segment is stored in the buffer. In a preferred embodiment, each buffer contains data belonging to at most one MAC SDU at any given time.

Alternatively, there may be only one buffer for all segmentation entities 440, $440_n$ containing data from only one logical channel. As a result, a MAC SDU may not be segmented for any another logical channel until the data in the buffer is transmitted.

Preferably, the multiplexing and TSN setting entity 420 is configured to prioritize a stored segment of a MAC SDU when creating the enhanced MAC-es PDU for the logical channel. The multiplexing and TSN setting entity 420 includes the stored segment of the MACSDU in an enhanced MAC-es PDU before requesting more data from the logical channel to which this MAC SDU belongs. Once all the stored MAC SDU segments are included in a enhanced MAC-es PDU, more data may be requested from the logical channel. According to this embodiment, a maximum of two MAC SDU segments per logical channel may be included in one enhanced MAC-e PDU.

Figure 5:
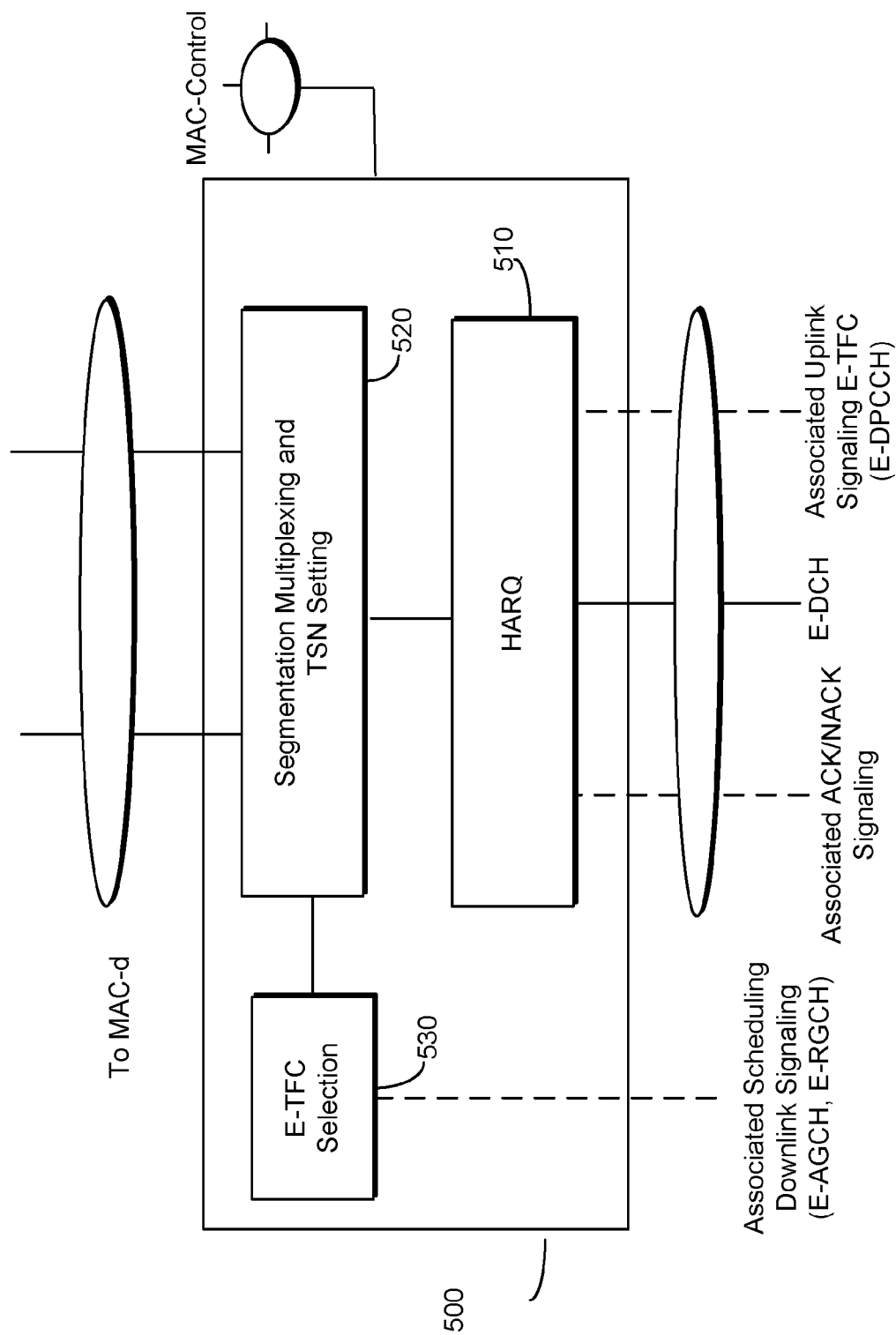
FIG. 5 is a block diagram of a WTRU enhanced MAC-e/es in accordance with a second embodiment.

FIG. 5 is a block diagram of a WTRU enhanced MAC-e/es 500 in accordance with a second embodiment. The WTRU enhanced MAC-e/es 500 comprises a HARQ entity 510, a segmentation, multiplexing, and TSN setting entity 520, and an E-TFC selection entity 530. In contrast to the first embodiment, the segmenting entity is incorporated with the multiplexing and TSN setting entity forming the segmentation, multiplexing, and TSN setting entity 520. The segmentation, multiplexing, and TSN setting entity 520 may have one buffer for each logical channel. Alternatively, the segmentation, multiplexing, and TSN setting entity 520 may have one buffer for all logical channels.

With the introduction of the segmentation entity, described above, the enhanced MAC-es PDU created may include a segmentation description or segmentation status field in addition to a TSN field. The segmentation description field may indicate whether a segment is included in the created enhanced MAC-es PDU. In addition, the segmentation description field may indicate whether additional segments are expected.

There may be restrictions placed on the segmentation functions in the WTRU enhanced MAC-e/es. For example, any one of the following restrictions may be used individually or in combination with another restriction to restrict segmentation functions in the WTRU enhanced MAC-e/es.

The support of segmentation functions in the WTRU enhanced MAC-e/es may be configured for a logical channel, for a MAC-d flow, or for the entire WTRU enhanced MAC-e/es. For example, when two logical channels, the dedicated control channel (DCCH) and the dedicated traffic channel (DTCH), are carried over E-DCH, segmentation functions may only be allowed for the DTCH and segmentation functions may not be allowed for the DCCH, or vice versa. The WTRU enhanced MAC-e/es may be configured to support segmentation functions using L3 signaling or the WTRU enhanced MAC-e/es may be preconfigured to support segmentation functions.

In addition, logical channels that are used in states other than the CELL_DCH state may be configured not to support segmentation functions. For example, the common control channel (CCCH) may be configured not to support segmentation functions. Further, for a logical channel, the enhanced MAC-es may be configured such that no reordering functions or reassembly functions are performed. As a result, the enhanced MAC-es may only disassemble a PDU if concatenation has been performed.

As an optional embodiment, the WTRU enhanced MAC-e/es may be configured not to insert a TSN number in the header of a enhanced MAC-e/es PDU or not increment a TSN number in the header of a enhanced MAC-e/es PDU. Also, the UTRAN enhanced MAC-e and UTRAN MAC/es may be configured not to support segmentation functions.

Furthermore, the support of segmentation functions in the WTRU enhanced MAC-e/es may only be supported for scheduled or, alternatively, non-scheduled flows. For example, if a first service is mapped to a non-scheduled grant at the same time a second service is mapped to a scheduled grant, segmentation functions may only be allowed for the non-scheduled first service instead of the scheduled second service.

Moreover, different segmentation thresholds may be defined to restrict segmentation functions in the WTRU enhanced MAC-e/es. A minimum SDU size may be defined as a MAC SDU size for which segmentation is allowed such that any MAC SDU smaller than minimum SDU size is not be segmented. A minimum segment size may be defined as the minimum size for MAC SDU segments such that the WTRU enhanced MAC-e/es is restricted from segmenting a MAC SDU if a remaining segment is smaller than the minimum segment size. A maximum segment size threshold may be defined as the maximum size for MAC SDU segments.

Additionally, other restrictions may be placed on the segmentation functions. For example, there may be limitations on the number of logical channels that may be segmented. Further, the number of MAC SDU segments placed in a logical channel may be limited.

Figure 6:
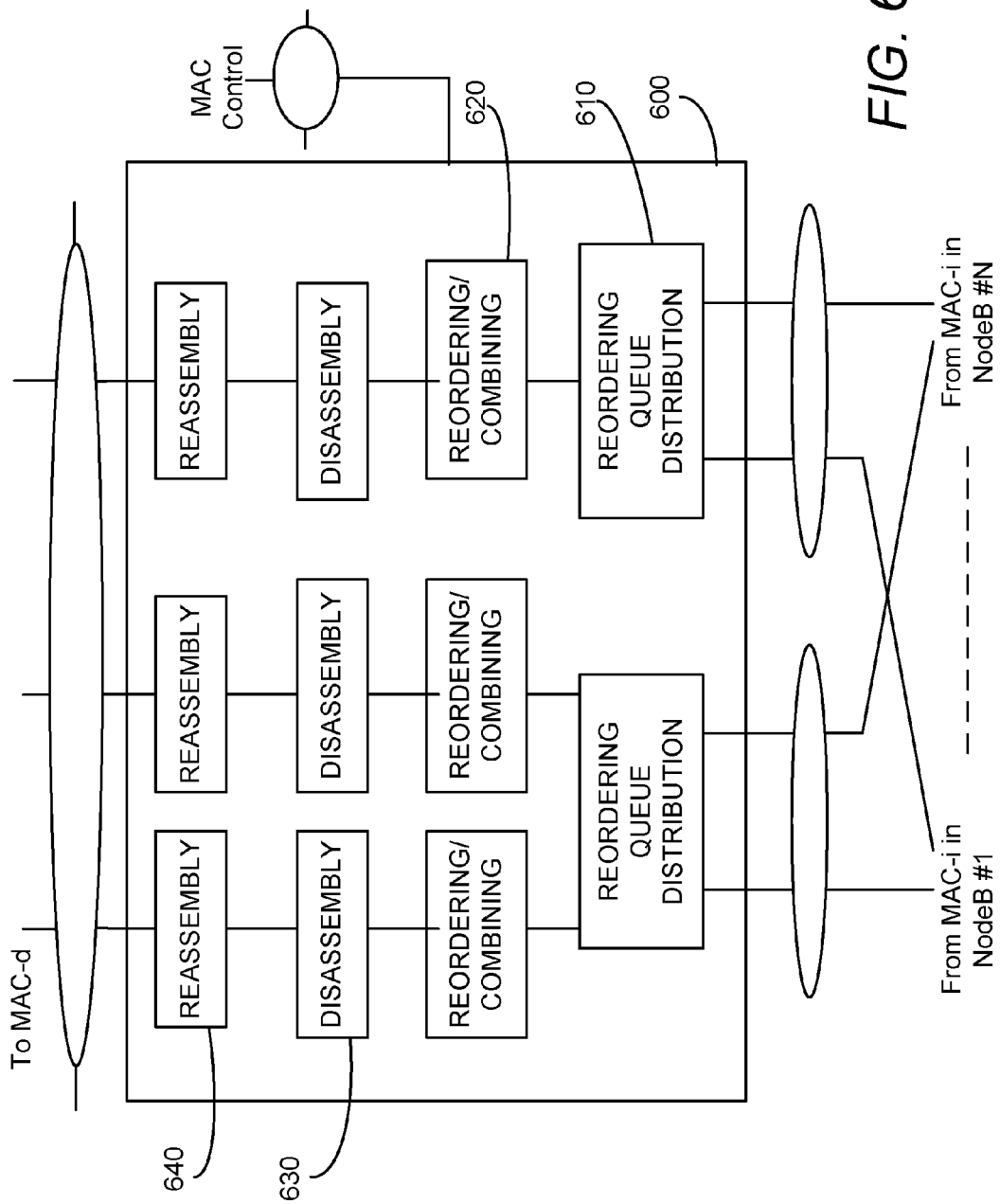
FIG. 6 is a block diagram of a UTRAN enhanced MAC-es in accordance with a first embodiment.

FIG. 6 is a block diagram of a UTRAN enhanced MAC-es 600 in accordance with a first embodiment. The UTRAN enhanced MAC-es 600 comprises a reordering queue distribution entity 610, a reordering/combining entity 620, a disassembly entity 630, and a reassembly entity 640. The MAC-es or enhanced MAC-es 600 is located in the SRNC or controlling radio network controller (CRNC) and handles E-DCH specification functionality that is not covered in the MAC-e or enhanced MAC-e in the NodeB. More specifically, the MAC-es and enhanced MAC-es perform the reassembly of segmented MAC SDUs. For each WTRU, there is one enhanced MAC-es in the SRNC.

The reordering queue distribution entity 610 is configured to route enhanced MAC-es PDUs to a correct reordering buffer based on the SRNC or controlling radio network controller (CRNC) configuration.

The reordering/combining entity 620 is configured to reorder received enhanced MAC-es PDUs according to a received TSN and NodeB tags. The NodeB tags may include a connection frame number (CFN) or subframe number. After receiving the enhanced MAC-es PDU, enhanced MAC-es PDUs with consecutive TSNs are delivered to the disassembly entity 630. Each logical channel has a reordering/combining entity 620. Enhanced MAC-es PDUs that are received out of order may be reordered in any number of ways obvious to those of skill in the art.

The disassembly entity 630 is configured to disassemble enhanced MAC-es PDUs. The disassembly of a enhanced MAC-es PDU includes the removal of a enhanced MAC-es header. A disassembled enhanced MAC-es PDU may contain multiple MAC SDUs, or segments thereof.

The reassembly entity 640 is configured to reassemble segmented MAC SDUs and deliver these SDUs to a correct higher layer entity. The reassembly entity 640 is coupled to the reordering/combining entity 620. The reassembly entity 640 is configured to reassemble segmented MAC SDUs and deliver these reassembled SDUs to the correct higher layer entity after macro-diversity reordering/combining is performed. As a result, the packets received by the reassembly entity 640 are in order and, if segmented, may be recombined.

The UTRAN enhanced MAC-es 600 further comprises a macro diversity selection entity in FDD mode when there is soft handover with multiple NodeBs. As a result, the reordering/combining entity 620 receives enhanced MAC-es PDUs from each NodeB in an E-DCH active set.

As shown in FIG. 6, in a preferred embodiment, the disassembly entity 630 is located before the reassembly entity 640. The disassembly entity 630 is further configured to disassemble a enhanced MAC-es PDU and forward the disassembled MAC-SDUs, or segments thereof to the reassembly entity 640. Then, the reassembly entity 640 is configured to reassemble segmented SDUs and forward all complete SDUs to the higher layers.

Figure 7:
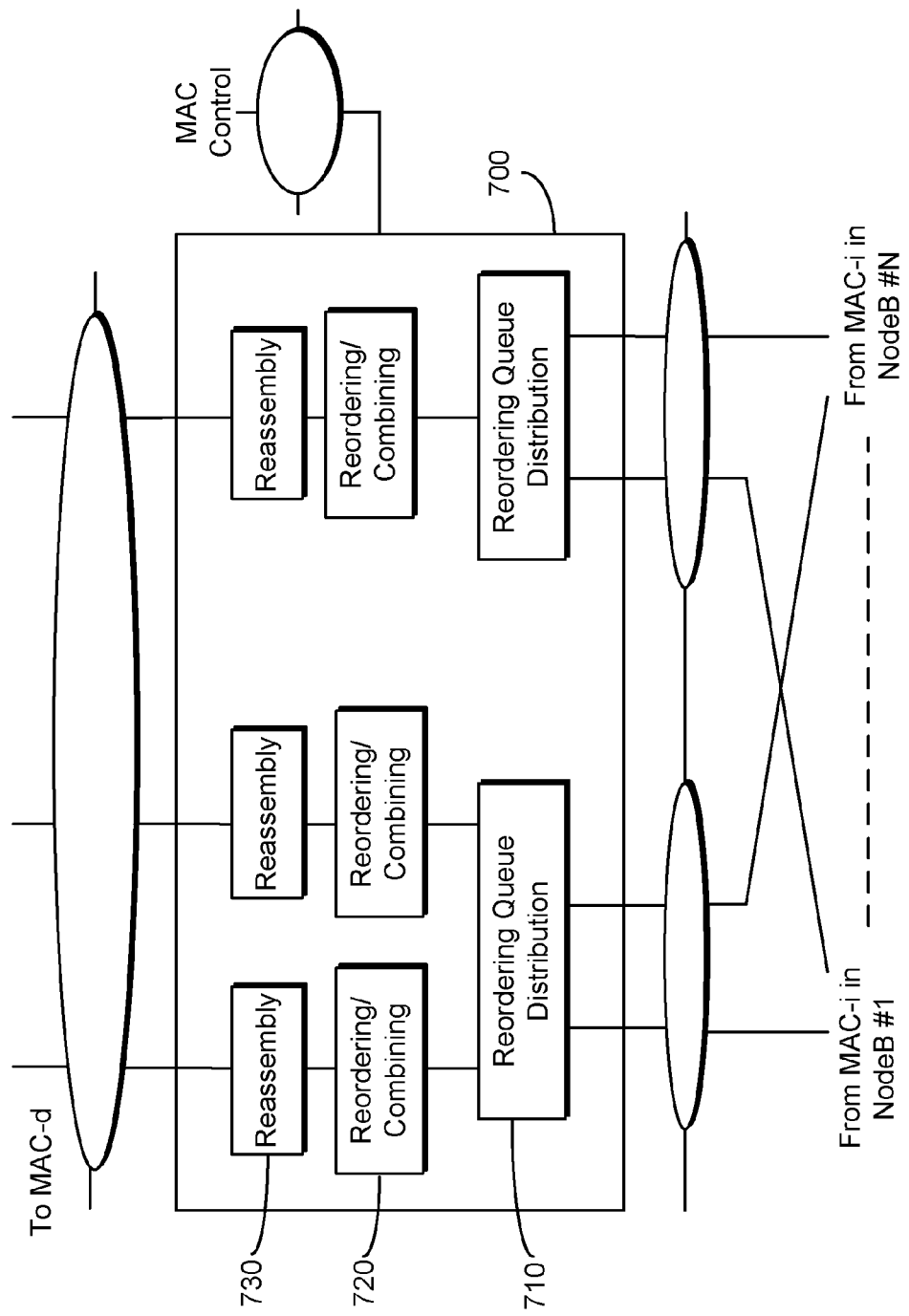
FIG. 7 is a block diagram of a UTRAN enhanced MAC-es in accordance with a second embodiment.

FIG. 7 is a block diagram of a UTRAN enhanced MAC-es 700 in accordance with a second embodiment. The UTRAN enhanced MAC-es 700 comprises a reordering queue distribution entity 710, a reordering/combining entity 720, and a reassembly entity 730. In contrast to the first embodiment, only the reassembly entity 730 is introduced into the enhanced MAC-es 700. However, the reassembly entity 730 includes the functions of the disassembly entity described hereinbefore in FIG. 6.

FIG. 8 shows a block diagram of an enhanced MAC-e 800 and an E-DCH scheduling entity 810. As stated above, the enhanced MAC-e 800 is located in a NodeB and controls access to the E-DCH. There is only one E-DCH scheduling entity 810 in the NodeB. The E-DCH scheduling entity 810 is configured to manage E-DCH cell resources between WTRUs. Based on scheduling requests, scheduling grants are determined and transmitted from the E-DCH scheduling entity 810. The enhanced MAC-e is connected to the enhanced MAC-es. The enhanced MAC-e 800 and the E-DCH scheduling entity 810 handle HSUPA specific functions in the NodeB.

The UTRAN enhanced MAC-e 800 shown in FIG. 8 comprises an E-DCH control entity 820 and a HARQ entity 840. The E-DCH control entity 820 is configured to receive scheduling requests and transmit scheduling grants based on the scheduling requests. The HARQ entity 840 handles the MAC functions relating to the HARQ protocol. The HARQ entity 840 is configured to support multiple HARQ processes. Each HARQ process is responsible for generating ACKs and NACKs indicating the delivery status of E-DCH transmissions.

In contrast to the existing UTRAN MAC-e, a de-multiplexing function is removed from the UTRAN enhanced MAC-e 800. The de-multiplexing function is instead present in the enhanced MAC-es. As a result, both the de-multiplexing function and a reassembly function are performed in the enhanced MAC-es.

FIG. 9 is a block diagram of a UTRAN enhanced MAC-es 900. The UTRAN enhanced MAC-es 900 shown in FIG. 9 comprises a reordering queue distribution entity 910, a reordering/combining entity 920, a disassembly entity 930, a reassembly entity 940, and a de-multiplexing entity 950. The enhanced MAC-es 900 is located in the SRNC and handles E-DCH specification functionality that is not covered in the enhanced MAC-e in the NodeB. The enhanced MAC-es 900 is connected to both the enhanced MAC-e and the MAC-d.

The reordering queue distribution entity 910 is configured to route enhanced MAC-es PDUs to a correct reordering buffer based on the SRNC configuration.

The reordering/combining entity 920 is configured to reorder received enhanced MAC-es PDUs according to a received TSN and NodeB tags. The NodeB tags may include a CFN or sub-frame number. After receiving the enhanced MAC-es PDU, enhanced MAC-es PDUs with consecutive TSNs are delivered to the disassembly entity 930. Each logical channel has a reordering/combining entity 920. Enhanced MAC-es PDUs that are received out of order may be reordered in any number of ways obvious to those of skill in the art.

The disassembly entity 930 is configured to disassemble enhanced MAC-es PDUs. The disassembly of an enhanced MAC-es PDU includes the removal of a enhanced MAC-es header. A disassembled enhanced MAC-es PDU may contain multiple MAC SDUs or segments thereof.

The reassembly entity 940, as described above, is configured to reassemble segmented MAC SDUs and deliver the MAC SDUs to a correct higher layer entity. The reassembly entity 940 is coupled to the reordering/combining entity 920. The reassembly entity 940 is configured to reassemble segmented MAC SDUs and deliver these reassembled SDUs to the correct higher layer entity after macro-diversity reordering/combining is performed. As a result, the packets received by the reassembly entity 940 are in order and, if segmented, may be recombined.

In an alternative embodiment, the reassembly entity 940 is further configured to disassemble enhanced MAC-es PDUs. As a result, a separate disassembly entity 930 may not be required.

The de-multiplexing entity 950 is configured to de-multiplex logical channels including enhanced MAC-e PDUs.

The UTRAN enhanced MAC-es 900 further comprises a macro diversity selection entity in FDD mode when there is soft handover with multiple NodeBs. As a result, the reordering/combining entity 920 receives enhanced MAC-es PDUs from each NodeB in an E-DCH active set.

Figure 10:
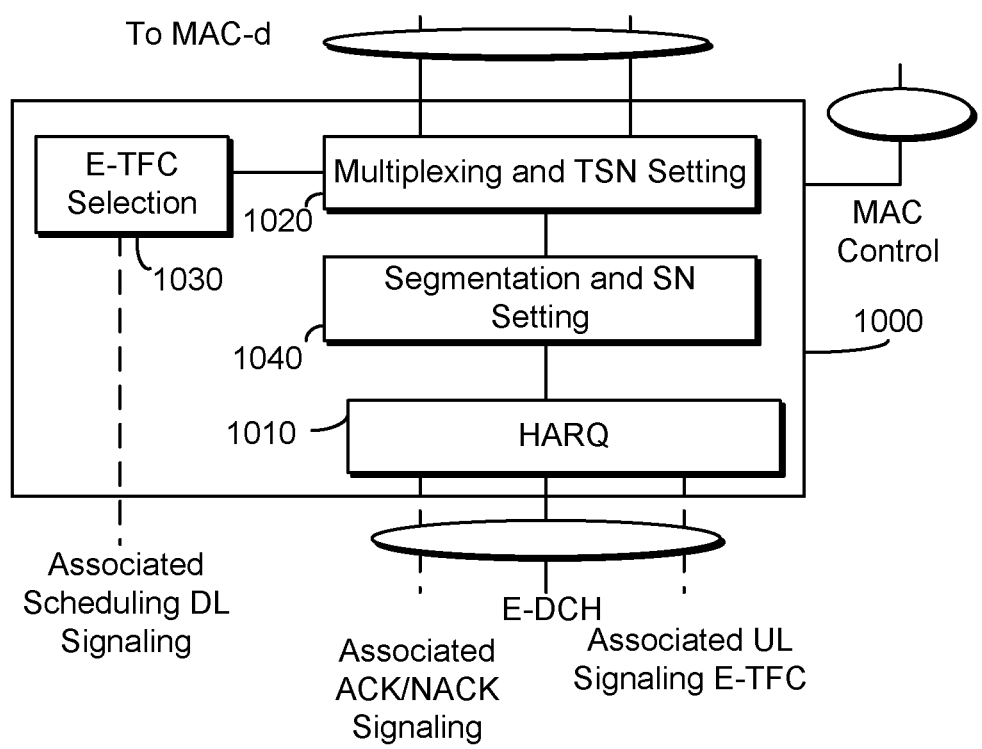
FIG. 10 is a block diagram of a WTRU enhanced MAC-e/es in accordance with a third embodiment.

FIG. 10 is a block diagram of a WTRU enhanced MAC-e/es 1000 in accordance with a third embodiment. The WTRU enhanced MAC-e/es 1000 comprises a HARQ entity 1010, a multiplexing and TSN setting entity 1020, an E-TFC selection entity 1030, and a segmentation and sequence number (SN) setting entity 1040. In contrast to the first and second embodiments described above, a single segmentation entity, the segmentation and SN setting entity 1040, is used for all logical channels. As shown in FIG. 10, the segmentation and SN setting entity 1040 is located after the multiplexing and TSN setting entity 1020.

The segmentation and SN setting entity 1040 is configured to segment a multiplexed MAC SDU, if the SDU is too large to fit into a selected enhanced MAC-e payload as instructed by the E-TFC selection entity. For a subsequent transmission, if the remaining segment of MAC SDU is too large to fit into a selected enhanced MAC-e payload as instructed by the E-TFC selection entity 1030, this remaining segment may be segmented again. Further, the segmentation and SN setting entity 1040 may segment a multiplexed MAC SDU based on a remaining payload for the logical channels. The segmentation and SN setting entity 1040 segments multiplexed MAC SDUs for all logical channels.

The segmentation and SN setting entity 1040 may comprise a buffer configured to store a segment of a MAC SDU after the segmentation of the multiplexed MAC SDU. After the segmentation of the multiplexed MAC SDU, a segment of the multiplexed MAC SDU is transmitted and the remaining segment is stored in the buffer for transmission in a subsequent TTI.

The segmentation and SN setting entity 1040 may further be configured to include a SN in a segmented and multiplexed MAC SDU. The inclusion of the SN may permit the UTRAN to reorder segments prior to de-multiplexing. However, the inclusion of a SN in a segmented and multiplexed MAC SDU is optional. Further, the UTRAN may reorder segments based on information provided by the HARQ entity 1010.

Figure 11:
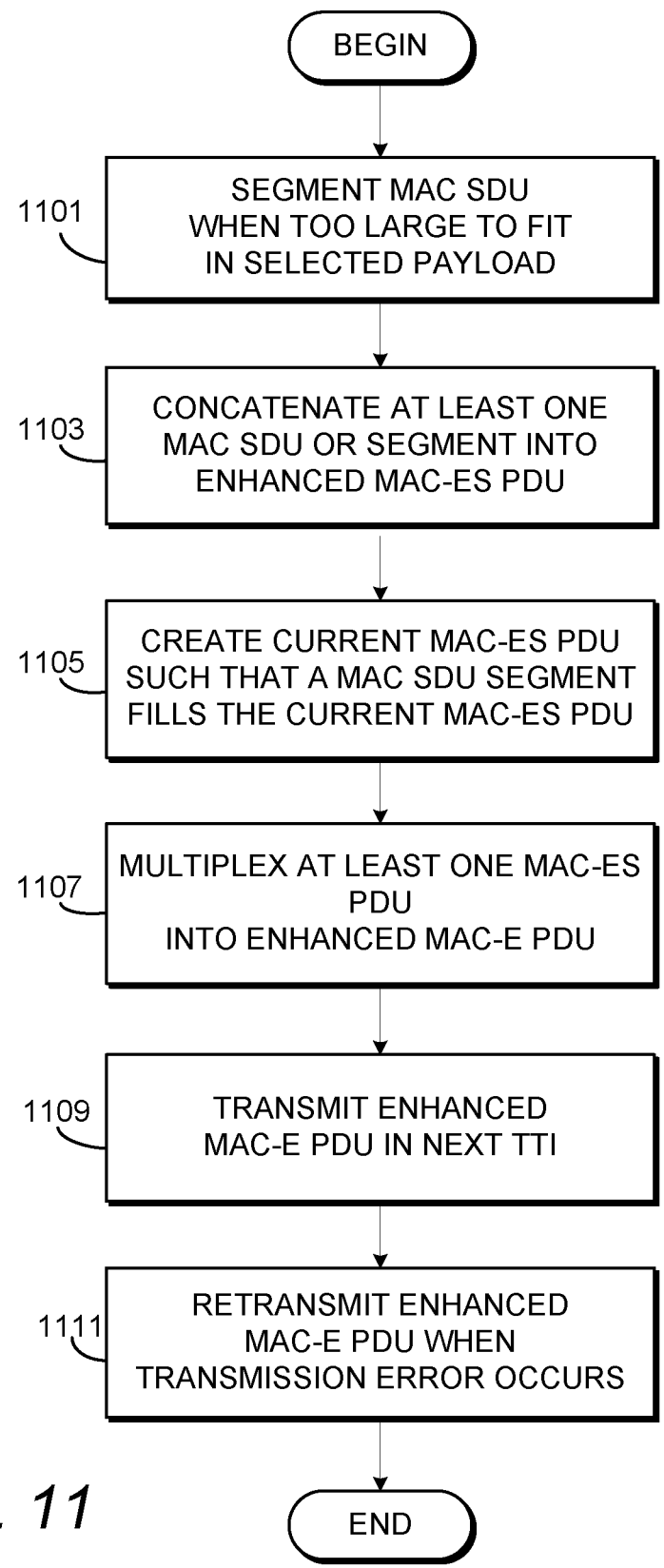
FIG. 11 is a block diagram of a method of segmentation of packets at the MAC layer.

FIG. 11 shows a method of segmentation in an enhanced MAC-e/es sub-layer in a WTRU. When a MAC SDU is received from a higher layer that is too large for the selected payload for an enhanced MAC-es PDU currently being created, the MAC SDU is segmented as shown in block 1101. MAC SDUs or segments of MAC SDUs are concatenated to create an enhanced MAC-es as indicated in block 1103. While creating an enhanced MAC-es PDU, MAC SDUs received from the higher layers may be segmented to fill an enhanced MAC-es currently being created as in block 1105. When the remaining payload of an enhanced MAC-es PDU currently being created is smaller than a MAC SDU received from the higher layers, the received MAC SDU may be segmented such that a segment of the received MAC SDU fills the remaining payload available in the enhanced MAC-es PDU currently being created. Multiple enhanced MAC-es PDUs are then multiplexed into a single enhanced MAC-e PDU as shown in block 1107. The enhanced MAC-e PDU may include MAC SDUs or segments thereof. The enhanced MAC-e PDU is then transmitted at the next TTI as in block 1109. If an error is detected in the transmission of the enhanced MAC-e PDU, a HARQ process retransmits the enhanced MAC-e PDU until successful transmission occurs as in block 1111.

In a further embodiment, a MAC-d sub-layer comprises a segmentation entity. The segmentation entity in the MAC-d is configured to segment RLC PDUs based on E-TFC selection performed at the MAC sub-layer. The MAC-d header for segmented RLC PDUs may include a segmentation related information. For example, the MAC-d header may include a segmentation indicator. Further, the MAC-d header may include information regarding the number of segments comprising the segmented RLC PDUs or whether more segments are expected.

In a further embodiment, an enhanced MAC-es sub-layer is configured to multiplex multiple logical channels into a MAC-d flow. As a result, an enhanced MAC-es PDU may contain MAC SDUs from different logical channels belonging to the same MAC-d flow.

Additionally, the enhanced MAC-es sub-layer is further configured to perform segmentation and TSN numbering for a MAC-d flow instead of a logical channel. As a result, the MAC-d flows may be multiplexed together in the enhanced MAC-e sub-layer.

Accordingly, the UTRAN enhanced MAC-e is responsible for de-multiplexing an enhanced MAC-e PDU into enhanced MAC-es PDUs and directing the enhanced MAC-es PDUs to the appropriate MAC-d flow. Further, the responsibility of the UTRAN enhanced MAC-es modified. For example, the reordering of enhanced MAC-es PDUs is now performed for a MAC-d flow. Next, the enhanced MAC-es PDUs are reassembled and/or disassembled as described above. Then, a de-multiplexing entity in the enhanced MAC-es configured for de-multiplexing the enhanced MAC-es PDUs into the MAC SDUs and routing the MAC SDUs to a correct logical channel.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a processor configured to produce medium access control (MAC) for dedicated channel (MAC-d) protocol data units (PDUs) for each of a plurality of dedicated channels;
the processor further configured to segment, for a logical channel, at least one MAC-d PDU of the MAC-d PDUs on a condition that the at least one MAC-d PDU is too large to fit into a payload size;
the processor further configured to produce a first MAC PDU by concatenating a segment of the at least one MAC-d PDU with another at least one MAC-d PDU or segment of the another at least one MAC-d PDU; wherein the first MAC PDU includes a transmission sequence number (TSN) and a segmentation description field; wherein a potential value of the segmentation description field indicates that the first MAC PDU ends in a segment of the at least one MAC-d PDU and a remaining segment of the at least one MAC-d PDU is to be concatenated in another first MAC PDU; and
the processor further configured to multiplex a plurality of first MAC PDUs into a second MAC PDU for transmission.

2. The WTRU of claim 1, wherein the at least one MAC-d PDU is a radio link control (RLC) PDU.

3. The WTRU of claim 1, further comprising:
at least one buffer configured to store the remaining segment of the at least one MAC-d PDU.

4. The WTRU of claim 3, wherein one buffer is associated with a plurality of segmentation entities.

5. The WTRU of claim 1, wherein the remaining segment of the MAC-d PDU is processed at a higher priority than a MAC-d PDU received from a logical channel.

6. The WTRU of claim 1, wherein the at least one MAC-d PDU is segmented on a condition that a resulting segment is larger than a minimum segment size.

7. The WTRU of claim 1, wherein a potential value of the segmentation description field indicates that the first MAC PDU begins in a segment of the at least one MAC-d PDU and the remaining segment of the MAC-d PDU was previously concatenated in another first MAC PDU.

8. A method, implemented in a wireless transmit/receive unit (WTRU), the method comprising:
- generating medium access control (MAC) for dedicated channel (MAC-d) protocol data units (PDUs) for each of a plurality of dedicated channels;
- segmenting, for a logical channel, at least one MAC-d PDU of the MAC-d PDUs on a condition that the at least one MAC-d PDU is too large to fit into a payload size;
- generating a first MAC PDU by concatenating a segment of the at least one MAC-d PDU with another at least one MAC-d PDU or segment of the another at least one MAC-d PDU; wherein the first MAC PDU includes a transmission sequence number (TSN) and a segmentation description field; wherein a potential value of the segmentation description field indicates that the first MAC PDU ends in a segment of the at least one MAC-d PDU and a remaining segment of the at least one MAC-d PDU is to be concatenated in another first MAC PDU; and
- multiplexing a plurality of first MAC PDUs into a second MAC PDU for transmission.

9. The method of claim 8 wherein the at least one MAC-d PDU is a radio link control (RLC) PDU.

10. The method of claim 8, further comprising:
- storing the remaining segment of the at least one MAC-d PDU.

11. The method of claim 10, wherein the remaining segment of the at least one MAC-d PDU is stored in a buffer.

12. The method of claim 8, wherein the remaining segment of the MAC-d PDU is processed at a higher priority than a MAC-d PDU received from a logical channel.

13. The method of claim 8, wherein the at least one MAC-d PDU is segmented on a condition that a resulting segment is larger than a minimum segment size.

14. The method of claim 8, wherein a potential value of the segmentation description field indicates that the first MAC PDU begins in a segment of the at least one MAC-d PDU and the remaining segment of the MAC-d PDU was previously concatenated in another first MAC PDU.

* * * * *